United States Patent
Kim

(10) Patent No.: US 9,973,054 B2
(45) Date of Patent: May 15, 2018

(54) MOTOR WITH DAMPER MEMBER ON BEARING

(71) Applicant: LG INNOTEK CO., LTD., Seoul (KR)

(72) Inventor: Byung Yong Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 1122 days.

(21) Appl. No.: 13/917,181

(22) Filed: Jun. 13, 2013

(65) Prior Publication Data

US 2013/0334920 A1 Dec. 19, 2013

(30) Foreign Application Priority Data

Jun. 15, 2012 (KR) .......... 10-2012-0064171

(51) Int. Cl.
*H02K 5/10* (2006.01)
*H02K 5/173* (2006.01)

(52) U.S. Cl.
CPC ............ *H02K 5/10* (2013.01); *H02K 5/1732* (2013.01)

(58) Field of Classification Search
CPC .............................. H02K 5/10; H02K 5/1732
USPC ..................... 310/88, 90, 91; 384/506, 539
IPC ...................................................... H02K 5/10
See application file for complete search history.

(56) References Cited

U.S. PATENT DOCUMENTS

| | | | | |
|---|---|---|---|---|
| 5,101,114 A | * | 3/1992 | Isozumi ........... | F02N 11/00 290/48 |
| 5,961,222 A | * | 10/1999 | Yabe ............... | F16C 19/52 384/476 |
| 6,831,383 B2 | * | 12/2004 | Poon ............... | A47L 5/22 277/559 |
| 2003/0151320 A1 | * | 8/2003 | Poon ............... | A47L 5/22 310/90 |
| 2007/0052319 A1 | * | 3/2007 | Morikaku ........ | H01R 39/385 310/239 |
| 2008/0056633 A1 | * | 3/2008 | Stout .............. | F16C 23/04 384/535 |
| 2010/0014794 A1 | * | 1/2010 | Iida ................ | F16C 27/066 384/489 |
| 2013/0074618 A1 | * | 3/2013 | Chalmet .......... | F02N 15/067 74/6 |

(Continued)

FOREIGN PATENT DOCUMENTS

CN 1327292 A 12/2001
CN 101425716 A 5/2009

(Continued)

OTHER PUBLICATIONS

Office Action dated Sep. 1, 2016 in Chinese Application No. 201310238295.1.

(Continued)

*Primary Examiner* — John K Kim
(74) *Attorney, Agent, or Firm* — Saliwanchik, Lloyd & Eisenschenk

(57) ABSTRACT

Disclosed is a motor, the motor according to an exemplary embodiment of the present disclosure including a housing, a stator mounted on the housing, a rotor rotatably installed at a center of the stator by a rotation shaft, a bearing interposed between the rotation shaft and the housing to rotatably support the rotation shaft, and a damping member interposed between the bearing and a receiving groove portion of the bearing to interrupt penetration of moisture from outside and to apply a preload to the bearing.

13 Claims, 3 Drawing Sheets

(56) References Cited

U.S. PATENT DOCUMENTS

2013/0334920 A1* 12/2013 Kim ..................... H02K 5/10
                                                            310/88

FOREIGN PATENT DOCUMENTS

| CN | 201966726 U | 9/2011 |
|----|-------------|--------|
| CN | 202145615 U | 2/2012 |
| CN | 202145675 U | 2/2012 |
| DE | 2104452 A1  | 8/1972 |
| EP | 0423616 A1  | 4/1991 |
| EP | 1107431 A2  | 6/2001 |
| EP | 2198175 A2  | 6/2010 |
| FR | 2218010 A5  | 9/1974 |
| JP | S53138105 U | 11/1978 |
| JP | 07-253114 A | 10/1995 |
| JP | H07253114 A | 10/1995 |
| JP | H11220849 A | 8/1999 |
| JP | 2007074854 A | 3/2007 |

OTHER PUBLICATIONS

Extended European Search Report dated Jul. 17, 2017 in European Application No. 13171565.8.

\* cited by examiner

MOTOR WITH DAMPER MEMBER ON BEARING

CROSS-REFERENCE TO RELATED APPLICATION

This application claims the benefit under 35 U.S.C. § 119 of Korean Application No. 10-2012-0064171, filed Jun. 15, 2012, which is hereby incorporated by reference in its entirety.

BACKGROUND OF THE INVENTION

Field of the Invention

The present disclosure relates to a motor having a stator and a rotor.

Description of the Related Art

Generally, almost every vehicle employs an electric power-assist steering system. Such an electric power-assist steering system generates an assist force based on the steering torque and the steering angle, so as to enhance the steering performance of the vehicle.

That is, a steering system that assists a steering force of a vehicle with a separate power is used to enhance the motion stability of a vehicle.

Conventionally, the auxiliary steering device uses hydraulic pressure, but an Electronic Power Steering (EPS) system adapted to transmit a rotation output of an electric motor to a steering shaft via a speed reduction mechanism has been increasingly employed these days from a viewpoint of a reduction in engine load, a reduction in weight, an enhanced steering stability and a quick restoring force.

The EPS system is such that an Electronic Control Unit (ECU) drives a motor in response to steering conditions detected by a speed sensor, a torque angle sensor and a torque sensor to enhance a steering stability and provide a quick restoring force, whereby a driver can safely steer a vehicle.

The EPS system is also such that a motor assists a torque manipulating a steering wheel to allow a driver to steer a vehicle with less power, where the motor employs a Brushless Direct Current (BLDC) motor.

The BLDC motors have been increasingly used because the brushless motors are excellent in maintenance property, have a small size, and are capable of generating a high torque.

The BLDC motor generally forms an exterior look by coupling of a housing and a cover member, an inner circumferential surface of the housing is provided with a stator, and the stator is centrally formed with a rotor rotatably mounted in electrical interaction with the stator. The rotor is rotatably supported by a rotation shaft, and an upper surface of the rotation shaft is connected by a steering shaft of a vehicle to provide a power assisting the steering of the vehicle as mentioned above.

Meanwhile, the cover member is installed at an inside thereof with a PCB (Printed Circuit Board) mounted with a detection sensor provided in the form of a magnetic element. The detection sensor detects a magnetic force of a sensing magnet installed in a rotationally interlocking way with the rotor to learn a current position of the rotor.

In general, the sensing magnet is fixed to an upper surface of a plate installed at an upper surface of the rotor using an adhesive. A rotor position can be detected by coupling the plate to a rotation shaft in response to a magnetic field direction, in a case the sensing magnet is magnetized to the plate.

Meanwhile, a motor may introduce moisture and humidity into a motor housing along a rotation shaft, as the motor is, in most cases, installed at a place frequently exposed to rains and moisture. If the motor housing is penetrated by the moisture, a stator wound with a coil may be short-circuited to damage the motor, such that at least one groove is dug on an outside surface of a bearing supporting a rotation shaft and a seal member such as an O-ring is mounted on the groove.

However, the sealing structure suffers from a disadvantage in that an excessive coupling force is required during assembly process due to interference between an O-ring and a housing. The sealing structure suffers from another disadvantage in that a separate wave washer is required due to a preload member allowing a bearing to receive a predetermined pressure at all times, to make the assembly process complicated.

The sealing structure suffers from still another disadvantage in that a special bearing having an O-ring insertion groove at an outer ring, instead of a standard bearing, is required to increase a parts cost for bearing processing.

BRIEF SUMMARY

The present disclosure is directed to cope with the above-mentioned problems/disadvantages and it is an object of the present disclosure to provide a structure-improved motor configured to simplify the number of assembly processes and to decrease a manufacturing cost by reducing the number of parts.

In one general aspect of the present disclosure, there is provided a motor, the motor comprising: a housing; a stator mounted on the housing; a rotor rotatably installed at a center of the stator by a rotation shaft; a bearing interposed between the rotation shaft and the housing to rotatably support the rotation shaft; and a damping member interposed between the bearing and a receiving groove portion of the bearing to interrupt penetration of moisture from outside and to apply a preload to the bearing.

Preferably, but not necessarily, the damping member may be formed with any one of a rubber, urethane and silicone.

Preferably, but not necessarily, the damping member may be centrally formed with a through hole having a diameter greater than a diameter of the rotation shaft.

Preferably, but not necessarily, the damping member may be formed at a surface opposite to the housing with at least one ring-shaped protrusion.

Preferably, but not necessarily, the ring-shaped protrusion may be provided with at least a first protrusion and a second protrusion each having a different diameter.

Preferably, but not necessarily, the damping member may be formed with a flat surface opposite to a surface protrusively formed with the first and second protrusions.

Preferably, but not necessarily, the damping member may be configured such that the surface protrusively formed with the first and second protrusions surface-contacts the housing, and a surface opposite thereto surface-contacts an outer ring of the bearing and a casing.

Preferably, but not necessarily, the damping member may have a thickness thicker than a distance between the bearing and housing at an installed position of the damping member.

Preferably, but not necessarily, the damping member may adjust a bearing preload by using a hardness value based on a thickness and a material.

Preferably, but not necessarily, the damping member may have a diameter corresponding to a diameter of the outer ring of the bearing.

Preferably, but not necessarily, the through hole of the damping member may have a diameter greater than a diameter of an inner ring of the bearing.

Preferably, but not necessarily, each cross-section of the first protrusion and the second protrusion may take a shape of any one of a semi-circle, a triangle, a square and a polygon.

In an advantageous effect, a motor according to an exemplary embodiment of the present disclosure can simultaneously perform sealing and bearing preload operations using a rubber-materialed damper member to enable being applied with a standard bearing without recourse to performance of a sealing operation using an O-ring, and can reduce a manufacturing cost of the motor due to no need of a separate wave washer for bearing preload.

DETAILED DESCRIPTION

Now, a motor according to the exemplary embodiment of the present disclosure will be described in detail with reference to the accompanying drawings.

Figure 1:
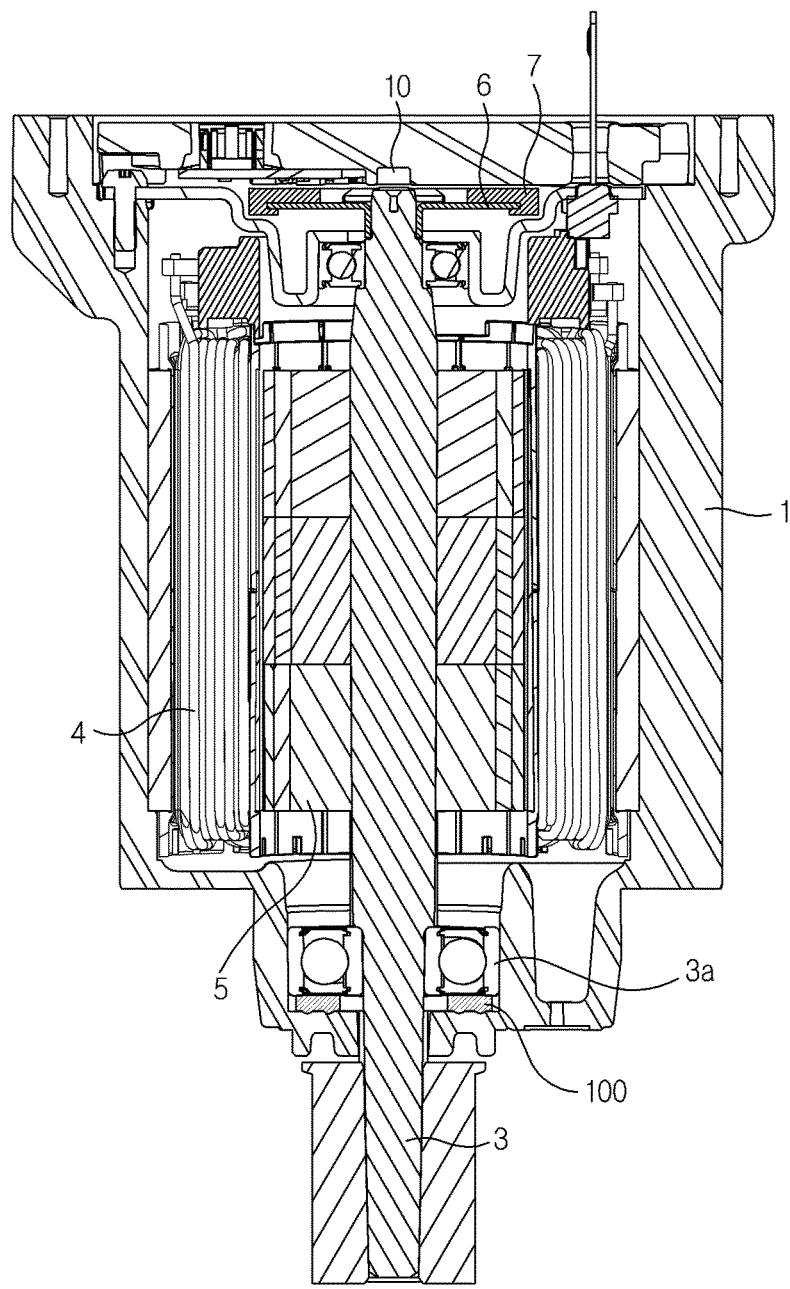
FIG. 1 is a schematic cross-sectional view illustrating a motor according to an exemplary embodiment of the present disclosure.
Figure 3:
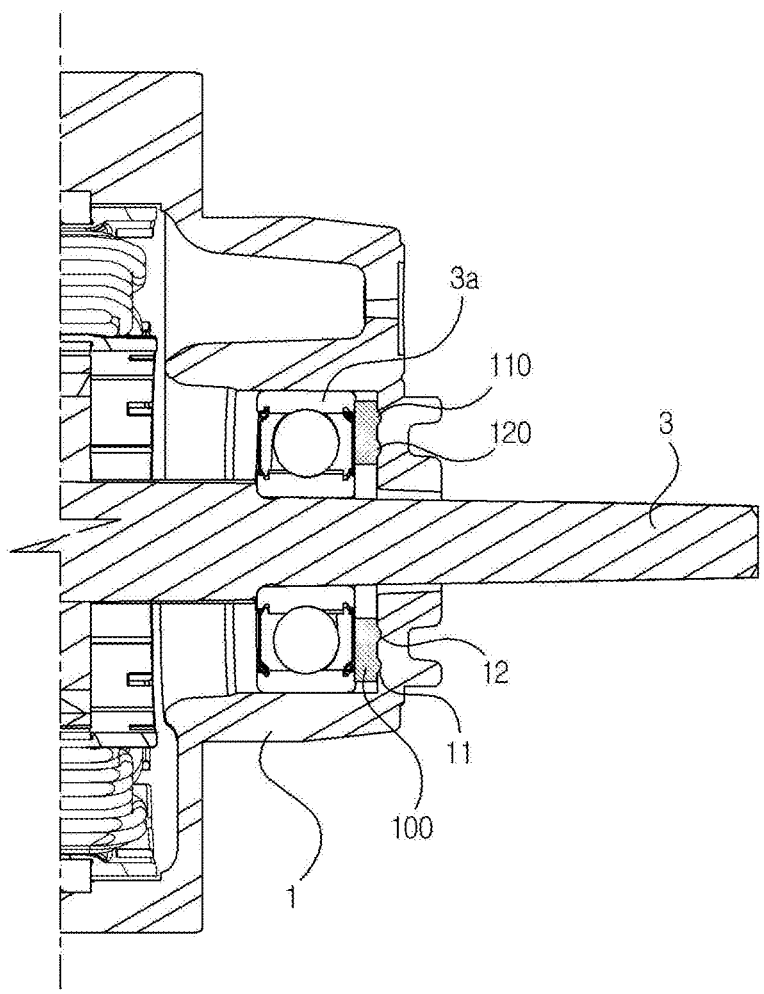
FIG. 3 is an enlarged view illustrating an installed position of a damper member of FIG. 1 according to an exemplary embodiment of the present disclosure.

FIG. 1 is a schematic cross-sectional view illustrating a motor according to an exemplary according to an exemplary embodiment of the present disclosure, and FIG. 3 is an enlarged view illustrating an installed position of a damper member of FIG. 1 according to an exemplary embodiment of the present disclosure.

Referring to FIG. 1, a motor according to an exemplary embodiment of the present disclosure includes a housing (1), a cover member (not shown) coupled to an upper surface of the housing (1), and a coupling of the housing (1) and the cover member forms an exterior look of the motor.

The housing (1) is provided at a lateral surface with a fixing bracket. The housing (1) is provided at an inner surface with a stator (4) wound with a plurality of coils. The stator (4) is centrally and rotatably formed with a rotor (5) that is rotated by a rotation shaft (3). The rotor (5) may be formed by a rotor core coupled by a magnet, or may be formed by a rotor core integrally formed with a magnet.

Both distal ends of the rotation shaft (3) may be rotatably supported by a bearing (3a) and the bearing (3a) may be provided with a standard bearing. The rotor (5) may be installed at an upper surface with and by a plate (6) coupled by a sensing magnet (7) for obtaining position information of the rotor (5).

Referring to FIG. 1 again, the plate (6) may be provided with a shape of a disc to be coupled to the rotation shaft (3) by a holder member (10). The plate (6) may be preferably formed with a metal material, and may be provided with an approximate shape of a disc.

The plate (6) is coaxially formed with the sensing magnet (7) to rotate in association with rotation of the rotation shaft (3), whereby the plate (6) is rotated to thereby rotate the sensing magnet (10).

The sensing magnet (7) may be provided with a shape of a disc having an outermost diameter corresponding to a diameter of the plate (6), centrally formed with a through hole having a predetermined diameter, and be configured to allow the rotation shaft (3) fixed to the plate (6) to pass through. A main magnet may be provided at a position adjacent to a periphery of the sensing magnet (7) and a position adjacent to the through hole may be provided with a sub magnet. An upper surface of the sensing magnet (7) may be configured such that a magnetic element (not shown) such as a Hall IC is formed on a PCB (Printed Circuit Board) fixed to an inner surface of the cover member to face the sensing magnet (7), whereby the rotation of the sensing magnet (7) can be detected.

Meanwhile, the sensing magnet (7) may be configured to wrap at least one surface of the plate (6) or may be configured to wrap an entire surface of the plate (6), as shown in FIG. 1.

However, the sensing magnet (7) may be configured such that there is no compulsory need of the plate (6) being a core, and it is sufficient to form a one-body with the plate (6), due to the greatest influence of centrifugal force operating to a circumferential direction from a center of a disc-shaped body of the sensing magnet (7) in response to motor rotation.

The holder member (10) may be coupled to an upper surface of the sensing magnet (7) to allow the sensing magnet (7) to always maintain a predetermined position. The holder member (10), however, is not essential and may be deleted, if necessary. The holder member (10) may be fixedly coupled to the plate (6) using a fixing unit (not shown) such as fastening screw. The holder member (10) may be formed with an elastic material such as a thin plated metal plate to be elastically deformed when coupled by the fixing unit, whereby the sensing magnet (7) may be position-fixed using the elasticity of the holder member (10).

Figure 2:
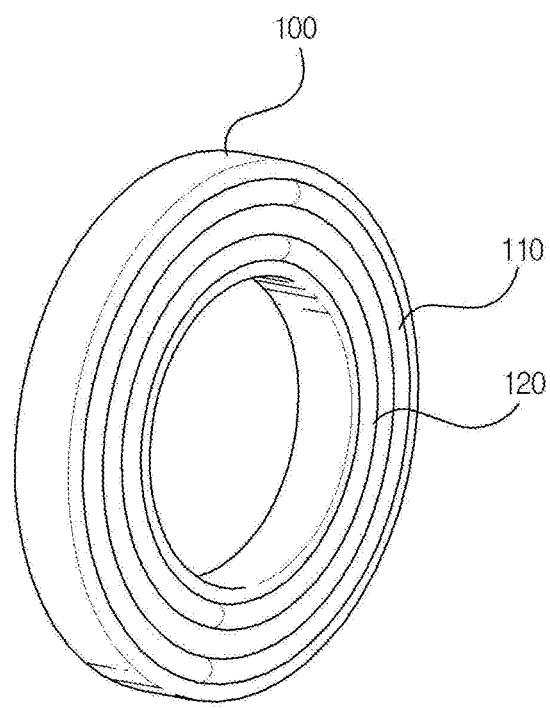
FIG. 2 is a perspective view illustrating a damper member according to an exemplary embodiment of the present disclosure.

Referring to FIGS. 1, 2 and 3, the characteristic of the present disclosure lies in a water-proof structure preventing moisture and humidity from penetrating into the motor through the rotation shaft (3) and the bearing (3a), and a damper member (100) thus configured is used to functionally replace the conventional O-ring and wave washer.

Referring to FIG. 2, the damper member (100) is formed at a lateral surface of a ring-shaped body having a predetermine thickness with first and second protrusions (110, 120), and is centrally formed with a through hole to be prevented from being interrupted with the rotation shaft (3).

The damper member (100) may be formed with a rubber material, and may be formed with urethane or silicone, if necessary, but may be formed with any material as long as the material is elastic. The damper member (100) may be preferably formed with a thickness thicker than a distance between the bearing (3a) and a floor surface of a receiving groove portion formed on a floor surface of the housing (1). However, if the thickness is excessively thicker than the distance, the bearing (3a) cannot be arranged at a predetermined fixing position, such that a thickness exceeding the distance is preferably formed at a height of a degree in which the damper member (100) can be elastically deformed, where a preload applied to the bearing (3a) may be adjusted by a thickness of the damper member (100) and a hardness value of material per se.

Referring to FIG. 3, an opposite surface of a surface protrusively formed with the first and second protrusions (110, 120) is flatly formed and may be preferably surface-contacted with an outer ring of the bearing (3a). At this time, the damper member (100) is structurally required to be prevented from being interrupted with an inner ring of the bearing (3a). If the outer ring and the inner ring of the bearing (3a) are contacted, the inner ring of the bearing (3a) may be prevented from rotating along with the rotation shaft (3).

Meanwhile, a surface corresponding to the housing (1) closely contacted with the damper member (100) may be formed with first and second concave grooves (11, 12). Each of the first and second concave grooves (11, 12) is provided to have a shape corresponding to that of each of the first and second protrusions (110, 120) protrusively provided at the damper member (100).

Referring to FIG. 3, in a case each cross-section of the first and second protrusions (110, 120) is of a semi-circle, each of the first and second concave grooves (11, 12) may be also formed with a semi-circular groove shape corresponding thereto. Meanwhile, although the cross-sectional shapes of the first and second protrusions (110, 120) and the cross-sectional shapes of the first and second concave grooves (11, 12) are exemplified to have a semi-circle, the present disclosure is not limited thereto. The cross-sectional shapes of the first and second protrusions (110, 120) and the cross-sectional shapes of the first and second concave grooves (11, 12) may be configured to have a triangle, a square, a polygon and other shape.

According to the configuration thus described, a cost burden involving a post-process may be advantageously eliminated, because a ring-shaped groove is formed on a surface opposite to the damper member (100) of the housing (1) using a separate tool, or the first and second concave grooves (11, 12) are integrally formed during formation of the housing (1).

Furthermore, a standard bearing per se may be advantageously used for the bearing (3a) to eliminate a groove processing work for installing an O-ring at an outer ring side of the bearing as in the conventional way, and at least two or more O-rings and a wave washer for preload of the bearing (3a) may be eliminated, and functions of the O-rings and the wave washer are unifiedly replaced by function of the damper member (100) to reduce the number of parts, whereby a manufacturing cost and an assembling cost can be improved.

Still furthermore, the rubberish damper member (100) is elastically deformed by being pressed between the bearing (3a) and housing (1) to allow an elastic restoring force to act as a preload of the bearing (3a) to dispense with a separate wave washer, and moisture is prevented from penetrating the motor from outside to maintain air-tightened sealed state of the motor by complementary coupling between the first and second protrusions (110, 120) and the first and second concave grooves (11, 12).

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

What is claimed is:

1. A motor, the motor comprising:
a housing;
a stator mounted in the housing;
a rotor rotatably installed at a center of the stator by a rotation shaft;
a bearing in the housing to rotatably support the rotation shaft, wherein the rotation shaft is inserted through the bearing; and
a damping member formed at a surface thereof with at least one ring-shaped protrusion,
wherein the damping member is interposed between the bearing and a receiving groove portion of the housing, such that the damping member is configured to interrupt penetration of moisture from outside and to apply a preload to the bearing;
wherein the at least one ring-shaped protrusion of the damping member is formed at a surface facing the housing,
wherein the ring-shaped protrusion is provided with at least a first protrusion and a second protrusion each having a different diameter,
wherein the damping member is formed with a flat surface opposite to a surface protrusively formed with the first and second protrusions,
wherein the receiving groove portion of the housing is formed at a surface of the housing opposite to the flat surface of the damping member, and
wherein the receiving groove portion of the housing includes a first concave groove and a second concave groove, each having a shape corresponding to that of each of the first and second protrusions.

2. The motor of claim 1, wherein the damping member is formed with any one of a rubber, urethane and silicone.

3. The motor of claim 1, wherein the damping member is centrally formed with a through hole having an inner diameter greater than an outer diameter of the rotation shaft.

4. The motor of claim 1, wherein the damping member is configured such that the surface protrusively formed with the first and second protrusions surface-contacts the housing, and the flat surface opposite thereto surface-contacts the outer ring of the bearing and the housing.

5. The motor of claim 1, wherein the damping member has an axial thickness thicker than a distance between an upper surface of the bearing and an inner surface of the housing contacting the damping member.

6. The motor of claim 5, wherein the damping member adjusts a bearing preload by using a hardness value based on a thickness and a material.

7. The motor of claim 1, wherein the damping member has a diameter corresponding to a diameter of the outer ring of the bearing.

8. The motor of claim 1, wherein a through hole of the damping member has an inner diameter greater than a diameter of an inner ring of the bearing.

9. The motor of claim 1, wherein each cross-section of the first protrusion and the second protrusion takes a shape of any one of a semi-circle, a triangle, a square, and a polygon.

10. The motor of claim 1, wherein the first and second protrusions of the damping member are formed at a surface facing receiving groove portion of the housing.

11. The motor of claim 4, wherein the damping member adjusts the preload to the bearing by using a hardness value of a material per se and a thickness of the damping member.

12. The motor of claim 1, wherein the first concave groove and the second concave groove each has a different diameter.

13. The motor of claim 12, wherein each of the first and second concave grooves is separately formed using a tool or integrally formed with the housing during formation of the housing.

\* \* \* \* \*